Jan. 21, 1958  C. L. DAY ET AL  2,820,489
GASSING HEAD
Filed Nov. 9, 1954
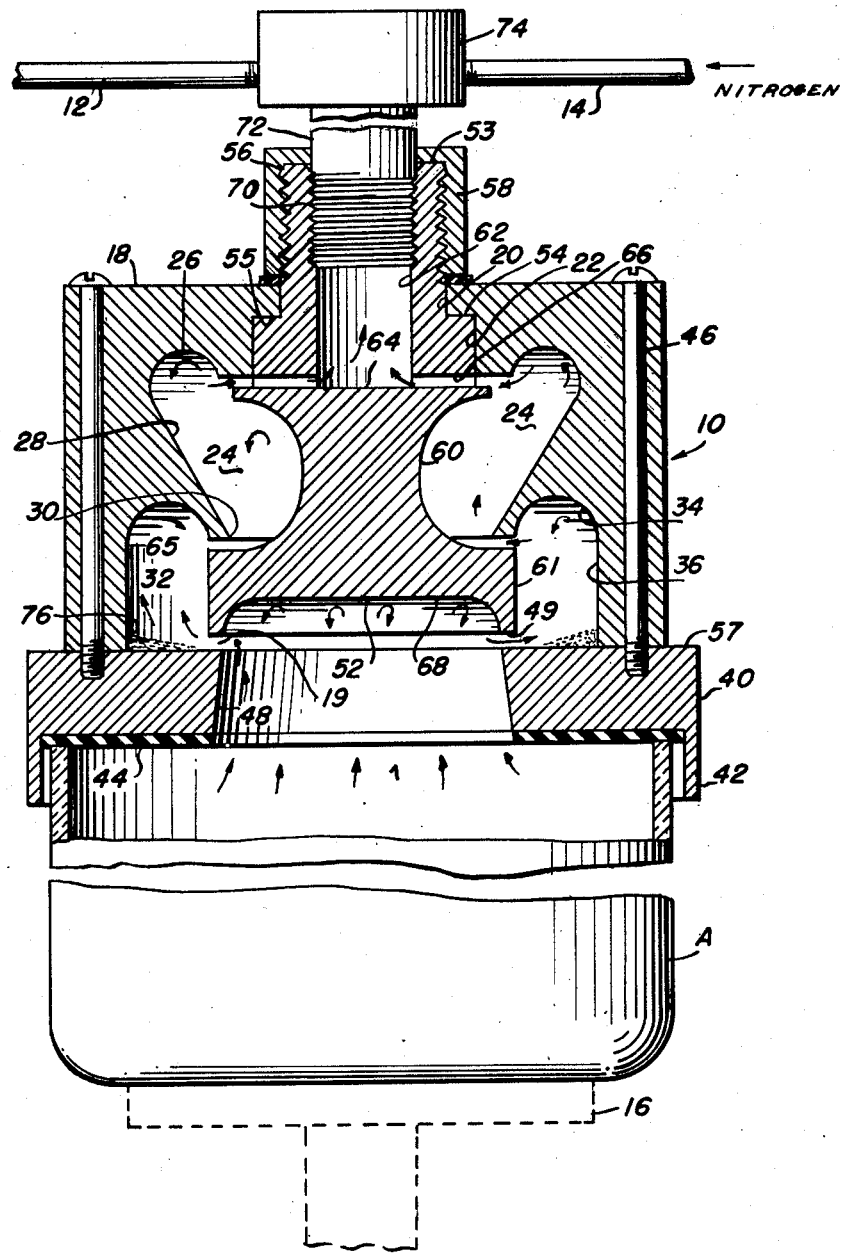
INVENTORS
Carl L. Day
Ransom C. Albrecht
Frederick E. Fauth
BY
Cushman, Darby & Cushman
ATTORNEYS

United States Patent Office 2,820,489
Patented Jan. 21, 1958

2,820,489
GASSING HEAD

Carl L. Day, Ransom C. Albrecht, and Frederick E. Fauth, Baltimore, Md., assignors to Crown Cork & Seal Company, Inc., Baltimore, Md., a corporation of New York Application November 9, 1954, Serial No. 467,681

17 Claims. (Cl. 141—7)

The present invention relates to a method and apparatus for supplying an inert gas to a container filled with particulate material and, more particularly, to a method and apparatus for first replacing the air or other gas from the filled container and then supplying an inert gas, such as nitrogen, to the filled container prior to the closing or sealing operation.

It has long been recognized that oxygen, heat and light have a deleterious effect on practically all packaged food products. Air is normally enfolded into a container when the container is filled with such dry food products as cereal, coffee, nuts, powdered eggs or the like. The oxygen of the air will react with the food product causing discoloration or spoilage. Consequently, it is necessary to evacuate all air enfolded into the container, as well as the headspace air in the container when the container is filled with a food product.

Vacuum packaging has been widely used in recent years as it reduces the residual oxygen content in containers, such as cans or glass jars. While this method has been a step in the right direction, it has also been advantageous under certain situations to pack food and other products in an atmosphere of inert gas, such as nitrogen.

There is no problem in evacuating a container wherein the product packaged is large in size and very heavy. However, in packaging a product such as ground coffee, the application of a vacuum to the container will cause the ground coffee to exhibit characteristics of a talcum powder. In other words, particles of the coffee will be carried off with the gas being evacuated from the container.

Therefore, an object of the present invention is to remove air or gas from containers filled with a particulate material, such as a granulated, pulverulent or powdered material, the removal of air or gas enveloping the material being such that the contents of the container are completely scavenged of the air or gas.

Another object of the present invention is to remove air or other gas from a container filled with particulate material and to replace the air or gas removed with an inert gas, such as nitrogen. By replacing the air with inert gas, the food product will be preserved and its shelf life in a sealed container increased. The aroma and flavor of the food product will also be preserved.

Still another object of the present invention is the provision of a method and apparatus wherein a high vacuum can be applied to a container filled with particulate material, the particles of the material entrained in the gas flowing from the container being separated from the gas stream and then returned to the container. By recovering any particles of material removed from a container during the vacuumizing operation, a saving of material is realized over a period of time and the weight content of the material is maintained within certain standards required in packaging of food products.

Still another object of the present invention is the utilization of the flow of inert gas to the container to return any particles of material previously removed from the container during the vacuumizing operation.

These and other objects of the invention will be more apparent from the following specification and the accompanying drawing which illustrates a preferred embodiment of the invention. The drawing, which illustrates the apparatus of the present invention, is a view in elevation taken partly in vertical cross-section.

The apparatus of the present invention as disclosed in the drawing may be generally described as including a head unit indicated by the numeral 10, a container supporting platform 16, and vacuum and inert gas lines 12 and 14, respectively, connected to the head unit. A container A filled with a particulate material, such as ground coffee or the like, is placed on container supporting platform 16 and raised into sealing engagement with head unit 10. Once container A has been brought into sealing engagement with head unit 10, vacuum of at least 28 inches of mercury is applied through vacuum line 12 to the head unit 10 so as to evacuate the air or gas enveloping the particulate material in container A. It will be noted that the vacuum is applied to the container centrally of the container so that the air or gas will be evacuated evenly from throughout the container.

When the vacuum is applied to container A, the gas or air which envelopes the particulate material in the container is removed from the container and during the course of removal, the gas or air will carry with it or entrain a certain amount of the particulate material which was in the container. Normally this material would be lost, but in the present invention, the gas stream flowing from container A is expanded in head unit 10 by flowing it through a small orifice into a large chamber. By expanding the gas stream flowing from container A, a reduction in its velocity occurs and this reduction will in turn cause a sudden deceleration of any particles entrained therein, whereby these particles will immediately leave the gas stream.

After a vacuum of at least 28 inches of mercury has been developed in container A, the source of vacuum is cut off from head unit 10 and an inert gas, such as nitrogen, is then supplied to head unit 10 through the inert gas line 14 to thereby treat the particulate material in container A. The flow of the inert gas stream through head unit 10 is the reverse of the flow of gas which has previously evacuated from container A. Thus, the inert gas being transferred into the container, so as to treat the contents of the particulate material, will carry with it any of the particles which had been previously separated or deposited in the head unit. These particles of particulate material will be returned to container A so that in a single treating operation, none of the contents of the container will be lost.

Preferably, the inert gas is applied to container A at a pressure equal to atmospheric pressure in order that the container can be transferred from the apparatus of the present invention to a container closing machine, such as disclosed in the copending application Serial No. 429,744 of Carl L. Day, Ransom C. Albrecht and Frederick E. Fauth, filed May 14, 1954, now Patent No. 2,763,107. The aforementioned application discloses apparatus for sealing a container in the presence of an inert gas. In other words, it is contemplated that the present invention can be utilized to remove air enveloping particulate material in a container and then replacing this air with an inert gas. The container can then be transferred to a container closing machine of the type disclosed in the aforementioned application where the container is sealed in the presence of a blanket of inert gas. Of course, other apparatus can be utilized to seal the container in the presence of an inert gas once the container has been initially treated by the method and/or apparatus disclosed in the present invention.

Referring specifically to the drawing, head unit 10 includes a generally cylindrical body member 18, which is preferably made of a transparent plastic material, such as lucite or the like, so that the interior may be visible to the operator of the machine. Body member 18 is provided with a short longitudinally extending bore 20 at its upper end and an enlarged counterbore 22 which is in axial alignment and communication with bore 20. The interior of body member 18 is provided with an annular inverted conical shaped cavity which communicates with enlarged counterbore 22. The inverted conical shaped cavity is provided with an upper wall 26, which is semi-circular in cross section, and a downwardly and inwardly tapered wall 28 terminating at 30. A second cavity is provided in body member 18 below the inverted conical shaped cavity and this lower cavity includes an upper wall 34, which is semi-circular in cross section, and extends from the lower end 30 of the upper cavity toward the periphery of body member 18, and a downwardly depending vertical wall 36 terminating at the lower end of body member 18.

Attached to the lower end of body member 18 is a flat cylindrical base member 40 having a downwardly depending peripheral flange 42. Base member 40 is detachably secured to body member 18 by means of bolts 46 extending through body member 18 and threaded into holes provided on the top surface of member 40. Body member 40 is provided with an upwardly and inwardly tapered central bore 48. The diameter of bore 48 at its smallest end is substantially equal to the diameter of the lower end of the upper inverted conical shaped cavity. A gasket member 44 is secured to the under surface of member 40 and provides a sealing surface for the lip of container A.

An elongated element 52 provided with a reduced end portion 53 is adapted to be inserted through the central hollow portion of body member 18 for the purposes described hereinafter. It will be noted that a shoulder 54 on element 52 engages the shoulder 55 formed by the bore 20 and enlarged counterbore 22. The reduced end portion 53 of element 52 extends through bore 20 and above the upper surface of body member 18 and is exteriorly threaded, as indicated at 56. A suitable cap nut 58 is threaded onto element 52 so as to retain the element in position within body member 18.

Elongated element 52 extends downwardly through the upper and lower cavities of body member 18 and terminates just short of the upper surface 57 of member 40. The bottom surface of element 52 is dished, as shown at 68, and is complementary in diameter to the smallest diameter of tapered bore 48 of member 40. In other words, the diameter of the lower portion of element 52 is greater than the smallest diameter of bore 48 and, thus, the lower end of element 52 is provided with a flat annular surface 49. A wide circumferential groove 60 is provided in the central portion of element 52 and is oppositely disposed from inclined wall 28 of the upper inverted conical cavity so as to form an annular chamber 24. The lower portion of member 52 is substantially cylindrical and forms a vertical wall 61 which is oppositely disposed from wall 36 of the lower cavity in body member 18. Wall 61 of element 52 cooperating with the walls 34 and 36 of the lower cavity defines a second lower chamber indicated by the numeral 32. The upper end of element 52 is provided with an axial bore 62 terminating at 64. Bore 62 communicates with chamber 24 by means of a plurality of laterally extending passages 66 in element 52. Since the lower end 30 of wall 28 is positioned adjacent and spaced from the lower portion of groove 60, as shown in the drawing, an annular orifice 65 is provided between chambers 24 and 32. Likewise, lower surface 49 of the lower end of element 52 terminates adjacent to and spaced from the upper surface 57 of member 40 so as to provide an annular transversely extending orifice 19.

Bore 62 of element 52 is interiorly threaded at its upper end as shown at 70 and receives a threaded fitting or conduit 72. Conduit 72 provides the inlet passage to head unit 18 for the vacuum or inert gas. The free or other end of conduit 72 is connected to a valve 74 of suitable design which selectively controls vacuum and inert gas from the lines 12 and 14, respectively. Valve 74 may be operated manually, mechanically, or in any suitable manner in timed relationship with the positioning of a container in sealing engagement with head unit 10.

The operation of the device is as follows:

Container A is positioned on container supporting platform 16 and raised vertically into sealing engagement with the lower surface of the element 40 of head unit 10. Valve 74 is then opened so as to permit a vacuum of at least 28 inches of mercury from a source of vacuum (not shown) to be applied to the container. Gas or air enveloping the particulate material in the container is evacuated through head unit 10, as shown by the arrows in the drawing. More specifically, the gas will flow upwardly from the container through the bore 48 of member 40. Since the apparatus of the present invention is used in treating a container filled with dry particulate material which is light in weight, such as coffee, powdered eggs, cereal or the like, a certain amount of the particulate material will be entrained in the air or gas being evacuated. A good portion of the gas being evacuated will be initially deflected by the dished shaped portion of element 52 so that some of the particles entrained in the air will fall backwardly into the container. The gas stream will pass through the orifice 19 into chamber 32 where it is rapidly expanded, thus, materially reducing its velocity. Any particles of particulate material which are still entrained in the gas stream will be suddenly decelerated and will separate from the gas stream and be deposited on the top surface 57 of member 40, as shown at 76. The gas being evacuated will then flow from chamber 32 through the small annular orifice 65 into the enlarged chamber 24 where again the gas stream will be expanded and its velocity reduced. The second reduction of velocity will remove any remaining particles entrained in the gas stream as these particles will be decelerated and separated from the gas stream as previously described.

After a vacuum of at least 28 inches has been established in container A, valve 74 is then operated to shut off the vacuum being applied to the container and to place the inert gas line 14 in communciation with conduit 72. The inert gas will flow into head unit 10 in a reverse direction to that of the gas which has been previously evacuated from the container. In other words, the inert gas will flow through bore 62 and outwardly through the passage 66 into chamber 24. The turbulence caused by the flow of gas into chamber 24 will cause the particles of particulate material previously deposited in this chamber to be entrained with the inert gas. The inert gas leaves chamber 24 through the orifice 65 and, as previously stated, will carry with it the particles of particulate material which were deposited in chamber 24. The inert gas entering chamber 32 through orifice 65 will also be turbulent because of the shape of chamber 35 and will pick up and entrain the particles of particulate material previously deposited in this chamber. The gas will then pass inwardly through orifice 19 and then centrally into container A.

The inert gas is applied to container A at a pressure substantially equal to atmospheric pressure and once this pressure has been developed in the container, valve 74 is closed and the container is removed from head unit 10. Immediately after the container is removed from head unit 10, it is sealed by a suitable capping or sealing machine, such as disclosed in our aforementioned copending application.

Head unit 10 may be completely disassembled and assembled for purposes of cleaning and sterilization. To disassemble the head unit, member 40 is detached from body member 18 by unthreading of the bolts 46. Once the base member 40 has been removed, cap member 58 can be unthreaded from the reduced end of element 52 and the element may then be removed downwardly through body member 18. After each of the individual parts has been cleaned, the device may be reassembled by repeating the above procedure in reverse.

Although the present invention has been described as being utilized with a method and appaartus for applying inert gas to a container, it is within the scope of the invention to vacuumize a container and without subsequently flowing an inert gas into the container.

The terminology used in the specification is for the purpose of description and not limitation, the scope of the invention being defined in the claims.

We claim:

1. A method of vacuumizing and gassing particulate material in a container comprising the steps of: evacuating the gas enveloping the particulate material in the container, rapidly expanding the gas being evacuated to cause a reduction in the velocity of the evacuating gas stream so that any particles of particulate material entrained in the gas stream will suddenly decelerate and leave the gas stream, and then introducing a treating gas under pressure into the container so as to envelope the particulate material therein.

2. A method of vacuumizing and gassing particulate material in a container comprising the steps of: evacuating the gas enveloping the particulate material in the container, flowing the evacuated gas in a stream through a small orifice into a large chamber to thereby cause an expansion of the gas and a reduction in the velocity of the gas stream so that any particles of particulate material which are entrained in the gas stream will suddenly decelerate, leave the stream and be deposited in the chamber, and then introducing a treating gas under pressure through the chamber into contact with any previously deposited particles and through the orifice into the container so that the previously deposited particles of particulate material will be returned to the container and the particulate material in the container will be enveloped by the treating gas.

3. A method of vacuumizing and gassing a particulate material in a container comprising the steps of: evacuating the gas enveloping the particulate material in the container, expanding the gas being evacuated into a series of successive chambers to thereby cause a reduction of the velocity of the evacuated gas stream in each of the chambers so that any particles of particulate material entrained in the gas stream will suddenly decelerate, leave the stream and be deposited in the chambers, and then introducing a blast of a treating gas under pressure through the chambers into contact with any previously deposited particles and then into the container in a reverse flow to the flow of gas evacuated so that any previously deposited particles of particulate material will be returned from the chambers to the container and the particulate material in the container will be enveloped by the treating gas.

4. A method of vacuumizing and gassing particulate material in a container comprising the steps of: evacuating the gas enveloping the particulate material in the container centrally from the container, flowing the evacuated gas in a stream through a series of alternate small orifices and large chambers to thereby cause a series of sudden reductions of velocity of the gas stream so that any particles of the particulate material entrained in the gas stream will suddenly decelerate, leave the stream and be deposited in the chambers, and then introducing a treating gas under pressure substantially equal to atmospheric pressure in a reverse flow through the chambers into contact with any previously deposited particles and through the orifices into the container so that any previously deposited particles of particulate material in the chambers will be returned to the container and the particulate material in the container will be enveloped in the treating gas at substantially atmospheric pressure.

5. A method of vacuumizing and then gassing particulate material in a container comprising the steps of: evacuating the gas enveloping the particulate material in the container centrally thereof in a stream, suddenly reducing the velocity of the evacuating gas stream so that any particles of particulate material entrained in the gas stream will suddenly decelerate and separate from the gas stream, and then introducing a treating gas under pressure into the container so as to envelope the particulate material therein.

6. A method for vacuumizing a container filled with particulate material comprising the steps of: evacuating the gas enveloping the particulate material in the container centrally from the container, flowing the evacuated gas in a stream through a small orifice into a large chamber to thereby cause expansion of the gas and a reduction in velocity of the gas stream so that any particles of particulate material entrained in the gas stream will suddenly decelerate, leave the stream and be deposited in the chamber.

7. A method of vacuumizing and gassing particulate material in a container comprising the steps of: evacuating the gas enveloping the particulate material in the container centrally from the container until the vacuum in the container is at least 28 inches of mercury, flowing the evacuated gas in a stream into a large chamber to cause expansion of the gas and reduction in the velocity of the gas stream so that any particles of particulate material entrained in the gas stream will suddenly decelerate, leave the gas stream and be deposited on a surface in the chamber, and then introducing a treating gas through the chamber into contact with any previously deposited particles therein and then into the container at a pressure substantially equal to atmospheric pressure in a reverse flow to the flow of the gas evacuated so as to return the particles of particulate material previously deposited to the container as well as envelope the particulate material in the container with the treating gas at a pressure substantially equal to atmospheric pressure.

8. A method of the character described in claim 7 wherein the evacuating gas stream is flowed into a series of large chambers through small orifices.

9. A method of the character described in claim 7 wherein the treating gas is inert.

10. A method of the character described in claim 7 wherein the treating gas is nitrogen.

11. In an apparatus for applying an inert gas to a container filled with particulate material, a head unit, a container support adapted to support a container filled with particulate material in sealing engagement with said head unit, means connected to said head unit for vacuumizing the container, means in said head unit for reducing the velocity of gas being evacuated from the container so that particles of material entrained in the gas will be separated from the gas, said velocity reducing means including means to receive particles separated from the gas, and means connected to said head unit for supplying an inert gas to the container after the container has been vacuumized.

12. An apparatus of the character described in claim 11 wherein the inert gas being supplied to said container after the container has been vacuumized is transferred through the means in said head unit for reducing the velocity of gas being evacuated from the container whereby any particles previously separated will be returned to the container.

13. In an apparatus for applying inert gas to a container filled with particulate material, a head unit, a container support positioned below and in alignment with said head unit and adapted to support a container filled with particulate material in sealing engagement with said head unit, a source of vacuum, a source of inert gas, valve means connected to said source of vacuum and to said source of inert gas for selectively applying a vacuum or inert gas to the head unit, said head unit having a passage therethrough communicating the interior of the container with said valve, said passage including a large chamber and at least one orifice between the chamber and the interior of the container, the large chamber being adapted to cause gas being evacuated from the container to expand thereby reducing its velocity and causing a deceleration of particles entrained therein so that they will be deposited in the chamber.

14. An apparatus of the character described in claim 13 wherein the passage through said head unit is provided with a series of large chambers, each chamber being connected to an adjacent chamber by at least one orifice.

15. In an apparatus for applying a vacuum to a container filled with particulate material, a head unit having a flat downwardly depending container engaging face, a container support adapted to hold a container filled with the particulate material in sealing engagement with the container engaging face of said head unit, said head unit having a central bore extending upwardly from its container engaging face and closed at its upper end, said head unit having an annular chamber interiorly thereof said chamber having a surface for receiving any particles of particulate material carried by gas being evacuated from the container, said chamber being in communication with said bore by at least one transversely extending orifice, said head having a passage communicating the upper portion of said chamber with a source of vacuum.

16. An apparatus of the character described in claim 15 wherein said head unit is provided with a series of annular chambers therein each chamber being in communication with an adjacent chamber by at least one orifice.

17. An apparatus of the character described in claim 15 wherein said passage connecting said head to a source of vacuum is also connected to a source of inert gas and wherein means are provided for selectively applying a vacuum to the container or supplying an inert gas thereto.

References Cited in the file of this patent

UNITED STATES PATENTS

| | | |
|---|---|---|
| 1,981,485 | Westin | Nov. 29, 1934 |
| 2,149,790 | Roesch | Mar. 7, 1939 |
| 2,335,192 | Moore | Nov. 23, 1943 |
| 2,613,864 | Carter | Oct. 14, 1952 |